Patented Jan. 9, 1945

2,366,749

UNITED STATES PATENT OFFICE 2,366,749

PROCESS FOR MAKING SYNTHETIC MENTHOL

Alfred Ofner and Eric C. Kunz, Montclair, N. J., assignors to Burton T. Bush, Inc., New York, N. Y., a corporation of New Jersey No Drawing. Application August 29, 1942, Serial No. 456,714

7 Claims. (Cl. 260—631)

This invention relates to the manufacture of synthetic menthol and more especially to the manufacture of crystalline synthetic menthol having substantially the taste and odor qualities of natural menthol.

Synthetic menthol has been made according to various processes. Thus it is known, for example, to synthesize menthol from thymol, piperitone, pulegone and d-citronellal. All but the last two dyed optically inactive products. All, however, yield synthetic menthol having taste and odor characteristics which differ materially from those of the natural product obtained by known means from American, Chinese or Japanese peppermint oils. In this connection, it is noted that de-neomenthol has a slightly musty, choking odor; d-isomenthol has a very faint camphor-like odor, being almost odorless; and l-menthol has a mint-like odor, but it differs materially in this respect from the natural product.

Menthol, synthetic and natural, finds varied application in the arts. There is a great demand for menthol having the odor and taste attributes of the natural product. Many users of menthol have not adopted the synthetic menthol simply because the latter does not possess the odor and taste characteristics of the natural product, although it otherwise is satisfactory. The prior art has recognized this condition and already the suggestion has been made to impart natural menthol odor and taste to synthetic menthol. Thus it is reported that synthetic l-menthol may be given a natural menthol odor by spraying it with approximately 0.03% of its weight of mint oil.

The prior art method of imparting natural menthol odor and taste characteristics is deficient in certain aspects. For one thing, the mint oil is fugitive and is merely deposited on the surface of the crystals of l-menthol. In addition, l-menthol so treated is not uniform in its odor and taste characteristics. This is obvious from a consideration of the fact that only very small quantities of oil are used and as a result many crystals of menthol do not receive any oil at all. Another defect of the prior art method is that it requires a special addition step, that is, the added spraying step, in order to try to attain its ends.

In accordance with this invention, we have found a simple method of obtaining crystalline synthetic menthol having the odor and taste characteristics of the natural product. We attain this end by crystallizing synthetic menthol from a solvent comprising distilled American peppermint terpenes, Japanese or Chinese de-mentholized peppermint oils.

The advantageous results of this invention were not to be foreseen. Normally, crystalline materials in purified form possess odor and taste properties independent of the solvent or solvents used in the crystallization. Thus it was not expected that the distilled American peppermint terpenes, or the de-mentholized Chinese or Japanese peppermint oils, all of which have a relatively high vapor pressure, would impart to synthetic menthol crystallized therefrom a lasting desirable odor and taste quality resembling that of natural menthol.

The distilled American peppermint terpenes employed in this invention may be obtained quite readily by treatment of the well known American peppermint terpenes of the market place. These terpenes are vacuum distilled and that clean-smelling fraction of the peppermint terpenes of commerce which distills between 30° C. and 90° C. under 5 millimeters mercury pressure is employed for the purposes of this invention. The American peppermint terpenes may be obtained by steam distilling the American mint plant. The resulting oil in the distillate is then re-distilled and the "lights" constitute the American peppermint terpenes of commerce.

The de-mentholized Japanese and Chinese oils employed in this invention are both well-known articles of commerce. They are obtained from the corresponding peppermint oils by removing substantially all of the menthol present in accordance with known methods.

The process of this invention may be employed by dissolving crystalline synthetic menthol in the distilled American peppermint terpenes, the de-mentholized Japanese or Chinese peppermint oils, either per se or in admixture with one or both of the others in any desired proportions, and re-crystallizing the synthetic menthol therefrom.

In order that the invention may be more fully understood, the following examples are given by way of illustration, but the invention is not to be limited thereto.

*Example 1*

200 grams of crystalline synthetic l-menthol, obtained by known means from d-citronellal, were dissolved in an equal weight of distilled American peppermint terpenes. The menthol was re-crystallized from the solvent by cooling the chamber in which the mixture was contained with brine maintained at —5° C. to 0° C.

The re-crystallized l-menthol was centrifuged and placed in a chamber kept under a vacuum of 100 millimeters of mercury and at a temperature of 30° C. for three days. 100 grams of l-menthol were obtained.

The foregoing experiment was repeated except that the terpenes mother liquor obtained from the foregoing re-crystallization was employed as the re-crystallization solvent. A yield of approximately 200 grams of crystalline l-menthol was obtained.

*Example 2*

Example 1 was repeated, using de-mentholized Japanese peppermint oil in place of the distilled American peppermint terpenes.

The results obtained were substantially the same as those obtained according to Example 1.

*Example 3*

Example 1 was repeated, using de-mentholized Chinese peppermint oil in place of the distilled American peppermint terpenes.

The results obtained were substantially the same as those obtained according to Example 1.

*Example 4*

200 grams of crystalline synthetic l-menthol, obtained by known means from de-citronellal, were dissolved in a mixture of 3 parts by weight of distilled American peppermint terpenes and 2 parts by weight of Chinese de-mentholized oil. The menthol was re-crystallized from the solvent by cooling the chamber in which the mixture was contained with brine maintained at −5° C. to 0° C.

The re-crystallized l-menthol was centrifuged and placed in a chamber kept under a vacuum of 100 millimeters of mercury and at a temperature of 30° C. for three days. 100 grams of l-menthol were obtained.

The foregoing experiment was repeated except that the terpenes mother liquor obtained from the foregoing re-crystallization was employed as the re-crystallization solvent. A yield of approximately 200 grams of crystalline l-menthol was obtained.

*Example 5*

Example 4 was repeated, using Japanese de-mentholized peppermint oil in place of Chinese de-mentholized peppermint oil.

The results obtained were substantially the same as those obtained according to Example 4.

*Example 6*

200 grams of dl-menthol were melted and 20 grams of distilled American peppermint terpenes were added to the melt.

The contents were allowed to stand overnight at 10° C. The resulting crystalline material was filtered for 15 minutes under a vacuum of 25 millimeters pressure and at a temperature of 10° C.

A yield of 100 grams of dl-menthol was obtained.

The foregoing experiment was repeated, using the terpenes mother liquor obtained from the foregoing re-crystallization as the re-crystallization solvent. A yield of approximately 200 grams of crystalline dl-menthol was obtained.

*Example 7*

Example 1 was repeated except that d-menthol was used in place of l-menthol. The d-menthol was obtained by resolving dl-menthol according to known methods.

The yields of re-crystallized d-menthol were substantially the same as those of re-crystallized l-menthol and re-crystallized dl-menthol obtained in accordance with the procedure of Examples 1 and 6, respectively.

In all of the foregoing examples, the resulting recrystallized synthetic menthol possesses the correct physical constants and, in addition, each product has odor and taste qualities which closely reproduce those of the natural l-menthol made from the corresponding peppermint oil.

The process of the foregoing examples may also be applied in the re-crystallization of dl-neomenthol, l-isomenthol, d-isomenthol and dl-isomenthol, individually or in admixture.

It is understood that this invention contemplates the imparting to synthetic menthol of odor and taste qualities closely resembling those of the natural product obtained from the corresponding peppermint oil. It will be understood, therefore, that the invention is not to be restricted to synthetic l-menthol or to any other one of the synthetic menthols. Consequently, the term "synthetic menthol" as used in the claims includes all of the various stereoisomeric forms of menthol, and where the context so admits, to mixtures of the individual stereoisomers. Further, the term refers to menthol obtained by chemical processing as distinguished from natural menthol which is obtained by physical methods and is therefore a natural product.

The scope of this invention may be rendered easier of ascertainment by a brief reference to certain aspects of the chemistry of menthol. Menthol has the following chemical structural formula:

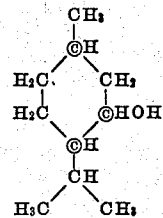

The carbon atoms which have been encircled are known as asymmetric carbon atoms, and under known principles of stereoisomerism, menthol would be expected to exist in 12 distinct forms, 8 optically active and 4 optically inactive. The 8 optically active forms would be expected to exist in 4 pairs of enantiomorphs. Each pair of enantiomorphs would be expected to form a racemic or inactive form.

Not all of the theoretically possible stereoisomers of menthol have been isolated and identified as yet. The following table gives the melting points and specific rotations of the known isomers as recorded in the literature:

| | Melting point, °C. | Specific rotation $[\alpha]_D^{15}$ |
|---|---|---|
| l-Menthol | 43.0 | −49.44 |
| d-Menthol | 43.0 | +50.10 |
| dl-Menthol | 34.0 | 0.0 |
| l-Neomenthol | | −19.72 |
| d-Neomenthol | −17.0 | +19.69 |
| dl-Neomenthol | 51.0 | 0.0 |
| l-Isomenthol | 80.5 | −24.10 |
| d-Isomenthol | 81.5 | +27.00 |
| dl-Isomenthol | 53.5 | 0.0 |
| l-Neoisomenthol | | |
| d-Neoisomenthol | | |
| dl-Neoisomenthol | 12–14 | 0.0 |

While this invention has been described in detail, it is understood that changes may be made pertaining thereto, and hence no limitations on the invention are intended other than those imposed by the scope of the appended claims.

We claim:

1. The process for making synthetic menthol having substantially the taste and odor properties of natural menthol which comprises crystallizing synthetic menthol from at least one material selected from the group consisting of substantially-de-mentholized Japanese peppermint oil, substantially-de-mentholized Chinese peppermint oil and distilled American peppermint terpenes.

2. The process for making synthetic l-menthol having substantially the taste and odor properties of natural l-menthol which comprises crystallizing synthetic l-menthol from at least one material selected from the group consisting of substantially-de-mentholized Japanese peppermint oil, substantially-de-mentholized Chinese peppermint oil and distilled American peppermint terpenes.

3. The process for making synthetic menthol having substantially the taste and odor properties of natural menthol which comprises crystallizing synthetic menthol from substantially-dementholized Japanese peppermint oil.

4. The process for making synthetic menthol having substantially the taste and odor properties of natural menthol which comprises crystallizing synthetic menthol from substantially-de-mentholized Chinese peppermint oil.

5. The process for making synthetic l-menthol having substantially the taste and odor properties of natural l-menthol which comprises crystallizing synthetic l-menthol from substantially-de-mentholized Japanese peppermint oil.

6. The process for making synthetic l-menthol having substantially the taste and odor properties of natural l-menthol which comprises crystallizing synthetic l-menthol from substantially-de-mentholized Chinese peppermint oil.

7. The process for making synthetic l-menthol having substantially the taste and odor properties of natural l-menthol which comprises crystallizing synthetic l-menthol from a mixture consisting of a major part by weight of distilled American peppermint terpenes and a minor part by weight of a material selected from a group consisting of substantially-de-mentholized Japanese and Chinese peppermint oils.

ALFRED OFNER.
ERIC C. KUNZ.

CERTIFICATE OF CORRECTION.

Patent No. 2,366,749.                                    January 9, 1945.

ALFRED OFNER, ET AL.

It is hereby certified that error appears in the printed specification of the above numbered patent requiring correction as follows: Page 1, first column, line 10, for the word "dyed" read --yield--; and that the said Letters Patent should be read with this correction therein that the same may conform to the record of the case in the Patent Office.

Signed and sealed this 10th day of April, A. D. 1945.

Leslie Frazer (Seal)                              Acting Commissioner of Patents.